United States Patent [19]
Oltman, Jr. et al.

[11] 3,873,934
[45] Mar. 25, 1975

[54] DEVICES FOR COUPLING MICROWAVE DIODE OSCILLATORS AND AMPLIFIERS TO POWER ACCUMULATION STRUCTURES

[75] Inventors: Henry G. Oltman, Jr., Woodland Hills; Richard J. Wagner, Los Angeles, both of Calif.

[73] Assignee: Hughes Aircraft Company, Culver City, Calif.

[22] Filed: May 13, 1974

[21] Appl. No.: 469,577

[52] U.S. Cl. .................. 330/56, 330/34, 331/117 D, 330/61 A, 333/83 R
[51] Int. Cl. .............................................. H03f 3/60
[58] Field of Search ........ 330/61 A, 34, 56; 331/97, 331/117 D; 333/83 R, 83 A

[56] References Cited

UNITED STATES PATENTS

| | | | |
|---|---|---|---|
| 3,733,560 | 5/1973 | Oltman, Jr. et al. | 330/56 X |
| 3,783,401 | 1/1974 | Oltman, Jr. | 330/34 X |

*Primary Examiner*—Nathan Kaufman
*Attorney, Agent, or Firm*—W. H. MacAllister; Lawrence V. Link, Jr.

[57] ABSTRACT

Devices for coupling microwave diodes and microwave diodes mounted in oscillator or amplifier circuits for quasi-optical power accumulation structures, and particularly to elliptical cavity structures, for the purpose of combining the powers provided by many diodes.

6 Claims, 15 Drawing Figures

PATENTED MAR 25 1975 3,873,934

SHEET 1 OF 4

DEVICES FOR COUPLING MICROWAVE DIODE OSCILLATORS AND AMPLIFIERS TO POWER ACCUMULATION STRUCTURES

CROSS-REFERENCES TO RELATED PATENTS AND APPLICATIONS

A portion of the subject matter disclosed herein is related to that of U.S. Pat. No. 3,733,560 for Elliptical Structure for Combining the Power of Many Microwave Sources, by Henry G. Oltman, Jr. and Hans A. Maurer; U.S. Pat. No. 3,783,401 for Means and Method for Suppressing Microwave Resonance in Elliptical Cavities, by Henry G. Oltman; and an application entitled Microwave Power Accumulation Structures Comprising a Plurality of Stacked Elliptical Cavities, by Henry G. Oltman, Jr., filed concurrently herewith.

BACKGROUND OF THE INVENTION

This invention relates to methods and devices for coupling microwave diodes and microwave diodes mounted in oscillator or amplifier circuits to quasi-optical power accumulation structures.

The above-cited patents relate generally to elliptical cavity structures which comprise coupling means for introducing energy at a first focus, amplifier modules or phase-locked generators disposed on the periphery of the cavity structure for producing signals of greater ampliture than received at the periphery from the first focus and means positioned at the second focus of the cavity for removing energy therefrom. The above-cited application relates to power accumulation devices wherein a plurality of such elliptical cavity structures are stacked and intercoupled such that greater input-output isolation is provided along with a reduction in the volume and weight required for a device having a given amount of power gain capability. A significant factor in the above-referenced and similar devices is the performance of the amplifier modules or phase locked generators and the coupling means for coupling them to the individual elliptical cavity structures. For example, the intercoupling of a large number of active diode amplifier modules always presents the possibility of the creation of a multitude of active modes which present stability problems and degraded performance.

SUMMARY OF THE INVENTION

In accordance with one embodiment of the invention, amplifier modules are formed in a plurality of tunable coaxial cavities adapted to be formed in or disposed around the periphery of the above-discussed elliptical structures. Within each amplifier module cavity an amplifying diode is mounted by means of a microwave choke with a probe extending outward into the elliptical structure. The cavity is tuned to the frequency band of the incoming and transmitted radiation by means of a tuning screw in the wall of the module cavity, and screws disposed between the probe and the main body of the elliptical structure allow adjusting the coupling of each amplifier module to the electromagnetic field of the elliptical structure. Between the amplifier module cavities, septums may optionally be structured to minimize cross talk between the cavities; and the septums are preferably conductive plates extending into the elliptical structure far enough to extend the range of control of the coupling screws.

In accordance with a second embodiment of the invention, the amplifier module cavities are arranged just outside the perimeter of the elliptical structure and coupled through an iris with the coupling screw located in the iris. The advantage of this arrangement is the reduction of mutual coupling between neighboring diode cavities. As noted above, amplified mutually coupled signals can readily dominate the input signal and cause undesirable effects such as oscillation.

A third embodiment of the invention allows the coupling of two stacked elliptical structures through the amplifier modules. This results in a two-part amplifier module which when combined with the stacked elliptical structures has certain advantages as disclosed in the above-cited patent application. In this embodiment, the input signal is fed to the upper (for example) elliptical structure which couples the signal to each of the amplifier modules arranged around the periphery through a slot located in the septum separating the elliptical structures. The size of the slot and hence the amount of coupling is variable by means of a sliding plate which forms one side of the slot. Alternately the coupling may be adjusted by means of a tuning screw instead of the slidable plate. The screw is arranged to capacitively load the center of the coupling slot. In other respects the structure is similar to embodiment one described above.

An important aspect of the subject invention is an embodiment thereof which provides for coupling a reflection type diode amplifier to the elliptical structure so as to yield a structure which is flat. This makes it practical to stack a plurality of elliptical structures so as to increase the gain and/or output power in accordance with the invention of the above-cited patent application. In this embodiment a loop is provided on the diode probe and the diode mount assembly is rotatably mounted at the periphery of the elliptical structure. The loop provides coupling to the electromagnetic fields of the ellipitcal structure, and the degree of coupling may be adjusted by rotation of the diode mount assembly. Frequency adjustment and support of the coaxial center conductor of the probe is provided by a dielectric cylindrical slug which can be moved into and out of the high electrical field region of the cavity and frequency tuning is provided by a tuning screw located in the high field region. Also this embodiment may be used in a slightly modified form to couple two stacked elliptical structures for operation in the two port amplifier mode discussed above relative to embodiment three. For this type of operation, the diode module is offset from the symmetry line of the septum separating the two elliptical structures in order to create both a small and large iris and thereby make the amplifier nominally unidirectional.

It is therefore an object of this invention to provide improved devices for coupling microwave diodes and microwave diodes mounted in oscillator or amplifier circuits to quasi-optical power accumulator structures.

Another object is to provide devices for coupling amplifiers to stacked elliptical cavities so as to allow their operation in a two port amplifier mode.

Yet another object is to provide improved amplifier modules which are adaptable for use with elliptical cavity structures and which allow the practical stacking of a plurality of such structures so as to increase the signal gain thereof.

BRIEF DESCRIPTION OF THE DRAWINGS

The novel features which are characteristic of the invention both as to its organization and method of operation, together with further objects and advantages thereof, will be better understood from the following description considered in connection with the accompanying drawings in which like characters refer to like parts and in which.

DESCRIPTION OF THE PREFERRED EMBODIMENTS

Figure 1:
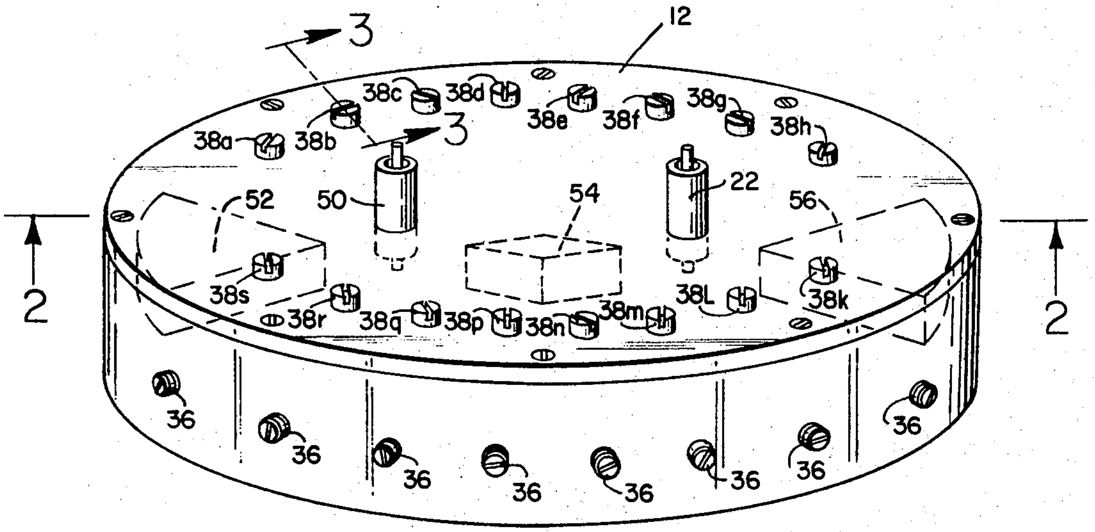
FIG. 1 is an outside view of an elliptical cavity structure which incorporates coupling devices in accordance with the subject invention.
Figure 2:
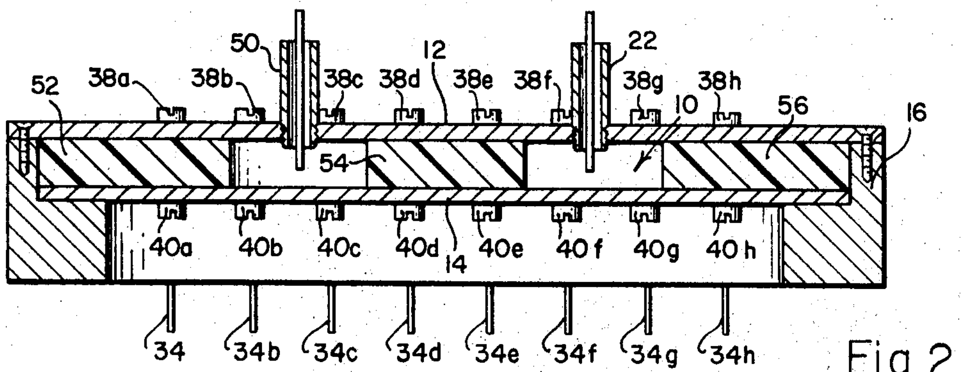
FIG. 2 is a sectional view, taken at 2—2 in FIG. 1.

Referring first to FIGS. 1–4, a substantially right, substantially elliptical, substantially cylindrical microwave cavity 10 is defined by a pair of substantially elliptical top and bottom plates 12, 14 and an up-standing side wall 16 electrically contacting the top and bottom walls 12 and 14. Around the periphery of the cavity 10 are formed a plurality of smaller cavities 20*a, b, c* . . . , as shown particularly in FIG. 4, for receiving microwave energy from the coaxial cable 22 which is positioned substantially at one focus of the elliptical cavity. In the embodiments shown in the figures, only eight such cavities are indicated on each side of the major axis of the elliptical cavity. In practice, the cavities may be more closely spaced and a larger number of cavities, as desired, may be used. The cavity 10 is mentioned hereinafter as an "elliptical cavity."

Figure 3:
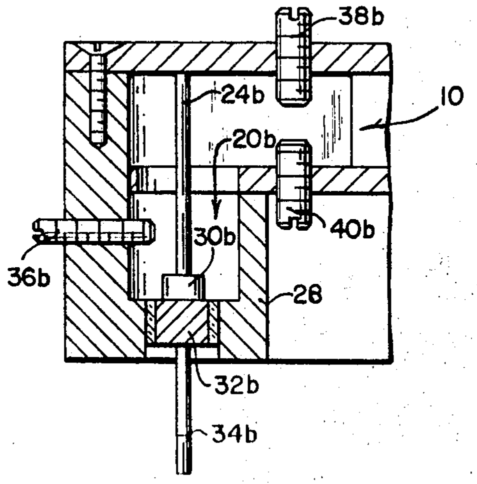
FIG. 3 is a sectional view, taken at 3—3 in FIG. 1.
Figure 4:
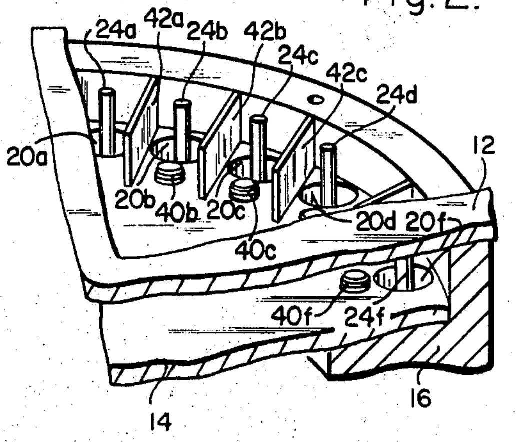
FIG. 4 is a fragmentary view, partly in section, of a portion of the apparatus of FIG. 1 with the top cover partly removed to show a typical embodiment of a coupling mechanism for coupling diode cavities to the elliptical cavity of the apparatus.

Referring to FIG. 3, probes 24*a, b, c,* . . . extend upward from the cavities 20*a, b, c* . . . into the elliptical cavity 10. The cavities 20*a, b, c* . . . are shown, typically, bored out of a ring 28 which depends from the side wall 16. Within each cavity 20*a, b, c* . . . is an amplifying diode 30*a, b, c* . . . , each being connected through a radio frequency choke 32*a, b, c* . . . to a pigtail 34*a, b, c* . . . to which a source of DC bias voltage (not shown) may be attached to cause the diode 30*a, b, c* . . . to operate in the proper range. Another mode of operation is to use a pulsed D.C. voltage to provide energy to the diodes.

Within each of the cavities 20*a, b, c* . . . is a tuning screw 36*a, b, c* . . . for adjusting the cavity 20*a, b, c,* . . . to the frequency band of the incoming and transmitted radiation. The coupling of the cavities 20*a, b, c* . . . to the elliptical cavity 10 is adjusted by adjusting the position of the crews 38*a, b, c* . . . and 40*a, b, c* . . . between the up-standing probes 24*a, b, c* . . . Between the cavities 20*a, b, c* . . . , septums 42*a, b, c* . . . may, optionally be structured to minimize cross talk between the cavities 20*a, b, c* . . . The septums 42*a, b, c* . . . are preferably conductive plates extending outward from the wall 16 into the cavity 10 far enough that the tuning screws 38*a, b, c* . . . and 40*a, b, c* . . . control the amount of coupling or energy delivered to and received from each of the cavities 20*a, b, c* . . . .

Incoming microwave energy is amplified by the diodes 30*a, b, c* . . . and retransmitted into the cavity 10 to the focus of the elliptical cavity where a coaxial cable 50 removes the power. It is understood that the coaxial cables 22 and 50 are representative only and that other known means for coupling microwave power into and out of the cavity 10 may be used.

When the cavities 20*a, b, c* . . . are operated as generators or oscillators, the incoming microwave energy phase-locks the generators so that the cumulative signal at the terminal 50, from each of the generators, arrives in phase.

It is important that resonances within the cavity 10 is suppressed. One means for absorbing or suppressing the resonant modes is to place an absorbing material 52, 54 and 56 along the major axis of the elliptical cavity.

Microwave power is introduced through coaxial cable 22 into the cavity 10. The power radiates radially from the axis of the coaxial cable 22 toward the cavities 20*a, b, c* . . . The incident fields are amplified by the diodes 30*a, b, c* . . . and transmitted back to the coaxial cable 50 at the other focus of the elliptical cavity 10. All signals travel from the focus associated with the coaxial cable 22 to the focus associated with the coaxial cable 50 via the elliptical boundary of the cavity 10 along equal length paths, whereby all signals received at the coaxial cable 50 are in phase and can be removed by the coaxial cable 50.

Alternatively, the diodes 30*a, b, c* . . . may be operated in an oscillatory mode, that is in an unstable condition to produce signals which, in general, would be out of phase. A small amplitude incident signal from the coaxial cable 22 injection phase-locks the sources causing them to deliver in phase signals to the coaxial cable 50.

Although the apparatus operates without absorbers 52, 54 and 56, it operates better with the resonant modes suppressed. The absorbers 52, 54 and 56 are representative of the resonance suppressors which are described and claimed in U.S. Pat. No. 3,733,560 by Henry G. Oltman, Jr. for "Means and Method for Suppressing Microwave Resonance in Elliptical Cavities."

Figure 6:
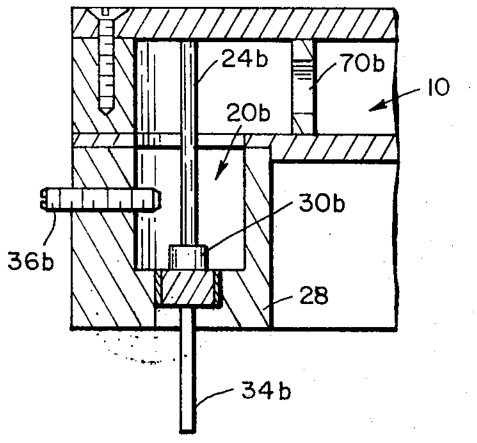
FIG. 6 is a view, partly in section, taken at 6—6 in FIG. 5.
Figure 5:
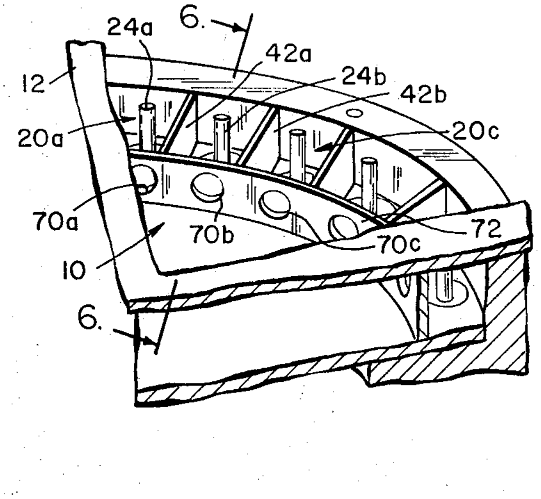
FIG. 5 is a fragmentary view, partly in section, of a portion of the apparatus of FIG. 1 with the top cover partly removed to show a second typical embodiment of a coupling mechanism for coupling diode cavities to the elliptical cavity.

FIG. 5 illustrates a second structure for coupling the diode cavities 20*a, b, c*, . . . to an elliptical cavity 10. Instead of using coupling screws such as 40*a, b, c*, of FIGS. 2, 3 and 4, the coupling technique of FIGS. 5 and 6 uses a plurality of orifices, 70*a, b, c* in a conductive wall or septum 72. The size of the origices 70*a, b, c* are predetermined to produce the desired amount of coupling. In all other respects, the apparatus of FIGS. 5 and 6 is substantially the same as the apparatus of FIGS. 3 and 4.

When a plurality of elliptical cavities, such as cavities 80, 82 and 84 (FIG. 7), are stacked, it may be necessary, and/or desirable, that the diode cavities such as diode cavities (modules) 74*a, b, c*, . . . 76*a* . . . 78*a* . . . , be positioned perpendicular to the sidewalls of the elliptical cavities 80, 82 and 84. A typical structure for illustrating such an arrangement is presented in FIG. 7. It is noted that to maintain the clarity of FIG. 7 only a sufficient number of diode modules are shown as are necessary to indicate the pattern of their disposition about the periphery of elliptical cavities 80, 82 and 84. It will be understood, for example, that diode modules are spaced completely around elliptical cavity 80 in accordance with the pattern exhibited by modules 74*a, b* and *c;* and that the disposition of diode modules around elliptical cavities 82 and 84 is similar to that described for cavity 80.

Figures 8, 11:
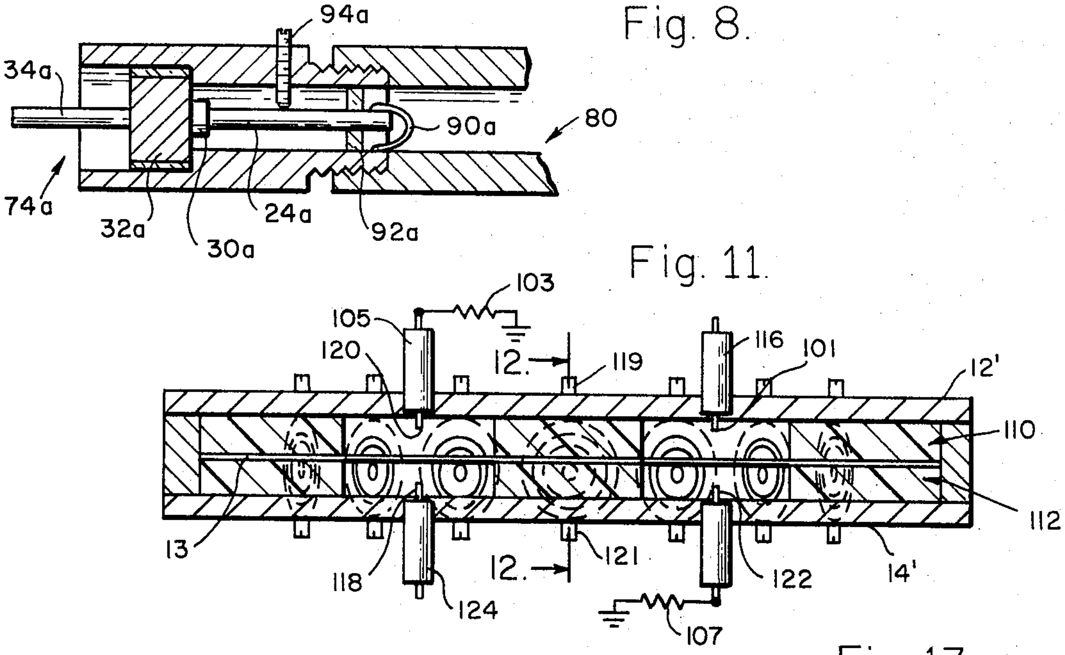
FIG. 8 is a sectional view taken at 8—8 of FIG. 7.
FIG. 11 is a sectional view of a pair of stacked elliptical cavities showing an alternative structure for coupling the cavities.

Diode modules 74*a* are shown in greater detail in FIG. 8 to which reference is now directed. As there shown, a loop 90*a* provides the coupling between the diode cavity and the fields of elliptical cavity 80, and the degree of coupling may be adjusted by rotating the loop. Frequency adjustment and support of coaxial center conductor (probe) 24*a* is provided by a dielectric cylindrical slug 92*a* which is adapted for movement into or out of the high electrical field region of the cavity. Frequency tuning is provided by means of a screw 94*a* which is disposed in the high field region.

Figure 7:
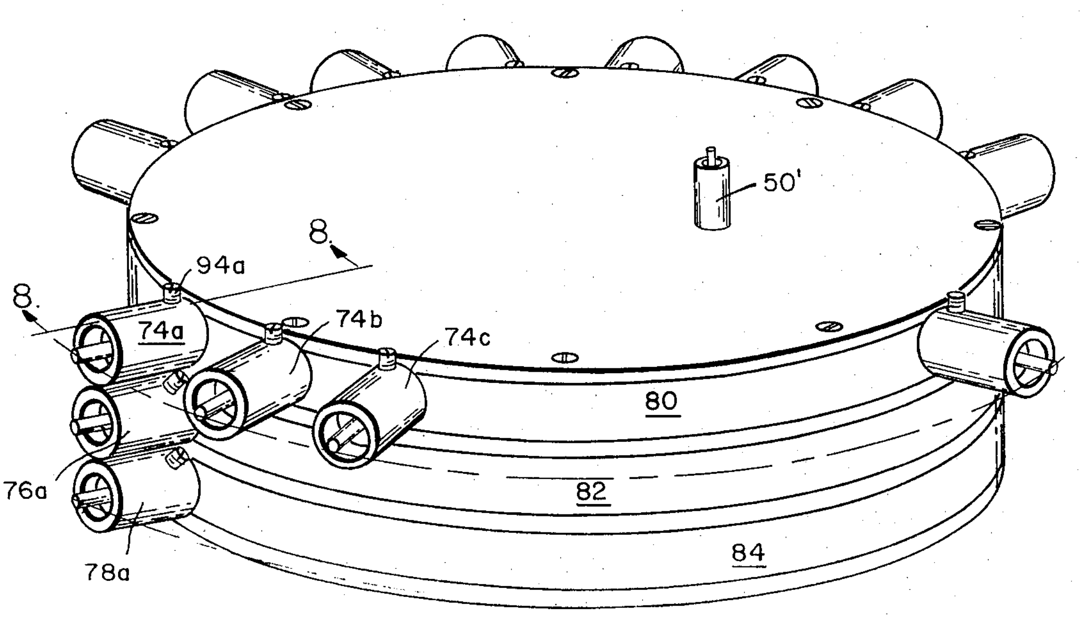
FIG. 7 is an outside view of a plurality of stacked elliptical cavities with the peripheral diode cavities postioned with their axes directed outward.
Figure 9:
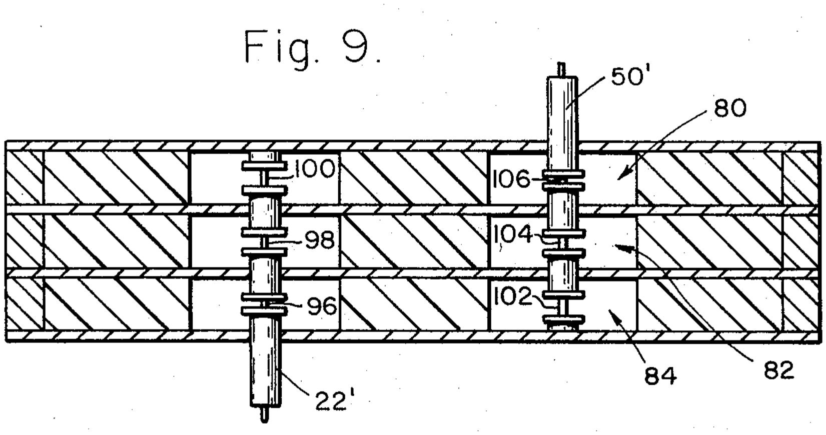
FIG. 9 is a sectional view taken in a plane of the major axes of the cavities of FIG. 7.

In the embodiment of FIGS. 7 and 9 elliptical cavities 80, 82 and 84 are stacked and single coaxial cable 22', whose outer conductor is split within the space of each cavity, delivers energy into the stacked cavities at a first focus thereof so as to introduce energy consecutively into the stacked cavities. The microwave energy in each of the stacked cavities radiates radially outward from its input focus to the amplifying modules, such as 74*a, b, c* . . . , on the periphery of each elliptical cavity. Coaxial cable 50' receives energy consecutively from the second focus of each of the elliptical cavities 80, 82 and 84. Since the energy is introduced into the cavities in sequence and it is removed in sequence, the time delay between receipt of energy by the sequentially excited elliptical cavities and the time delay between delivery of energy by corresponding elliptical cavities is the same, whereby the power outputs of each of the cavities 80, 82 and 84 add.

For the structure of FIGS. 7 and 9, an equal part of the incident signal would be fed to each unit. However, for application in which it may be desirable to stack structures of different diameters having different numbers of diodes modules, the fractional power coupling to each elliptical cavity would be varied according to its respective size and/or maximum power output. As noted above, although each elliptical cavity is excited in successively later phase relationships, the phase lag is corrected by collecting the amplifed signals with the opposite phase relationship. This is accomplished by arranging the input and output couplings on opposite sides of the elliptical structure. As a result, the transit time of any fractional part of the signal through the structure is the same as any other part of the signal.

As previously mentioned, for the embodiment of FIGS. 7 and 9 the relative coupling along coaxial lines 22' and 50' generally would be adjusted so that equal amounts of power are removed (or added) from the lines. However, the lines have either a reducing or increasing power level. That is, the power level on the input line is decreased after passing each input port, 96, 98 and 100, and the output power is similarly increased after passing each output port 102, 104 and 106. Therefore, on input line 22', a successively larger fraction of the available power must be extracted from the line in order to achieve power equality in each ELLPAC. This requirement dictates a change in physical dimensions for each coupling port.

It is noted that the diameters of the elliptical structures are completely independent even though they have equal foci separation as shown. The separation of the foci is determined by the relative lengths of the major and minor axes of the ellipses — not by the absolute length of the major axis.

Figure 10:
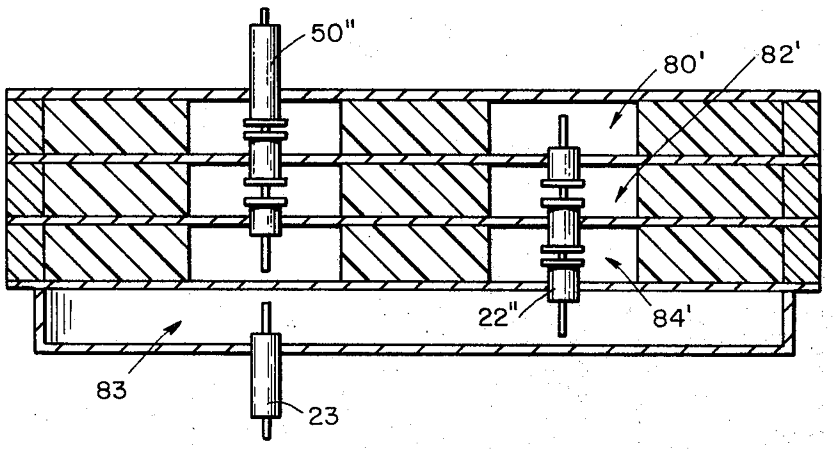
FIG. 10 is a sectional view, taken in the plane of the major axes of a plurality of elliptical cavities stacked and fed in accordance with one embodiment of this invention.

FIG. 10 depicts a second embodiment of the subject invention wherein elliptical cavity 83 is used as a preamplification stage for the signal driving the amplifying structure comprising parallel coupled cavities 80', 82' and 84'. In this manner an input signal applied on line 23, which is too low to be split up to drive the four output structures, can be amplified to the required power level.

Figure 12:
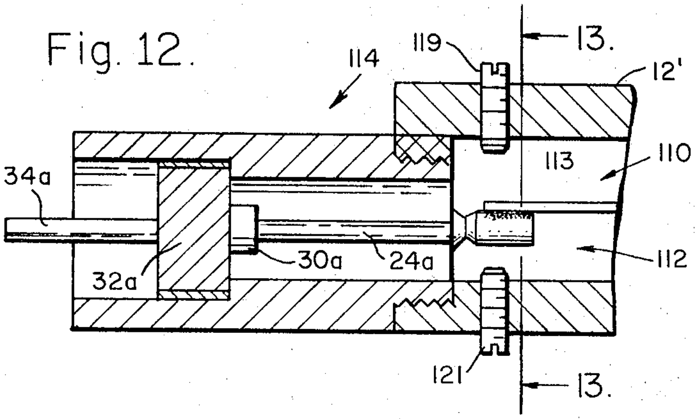
FIG. 12 is a sectional view taken at 12—12 in FIG. 11.
Figure 13:
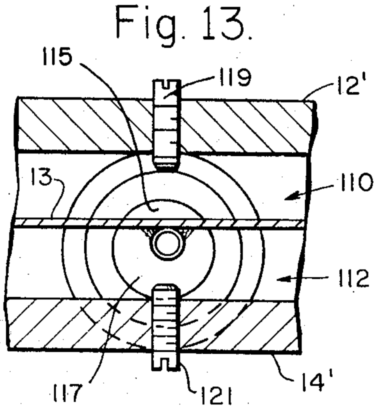
FIG. 13 is a sectional view taken at 13—13 in FIG. 12.

In accordance with a third embodiment of the invention, a plurality of elliptical cavities are stacked and intercoupled such that greater input-output isolation is provided along with a reduction in the volume and weight required for a device having a given amount of power gain capability. As shown in FIGS. 11 through 13, two elliptical cavities 110 and 112, which have a common wall 13, are stacked one on top of the other with the coupling between the two elliptical cavities provided by the diode cavities (modules) at the periphery of the ellipse. One such diode module, designated 114, is illustrated in FIGS. 12 and 13. The direction of signal flow is indicated by an arrow 113 in FIG. 12. Input and output coupling is primarily determined by the size of irises 115 and 117, with a small amount of coupling variation being provided by coupling screws 119 and 121. The diode module 114 is offset from the symmetry line of elliptical cavities 110 and 112 in order to create both the small iris 115 and the larger iris 117. In this manner the amplifier is made nominally unidirectional.

In the embodiment of FIG. 11 the two elliptical cavities are substantially identical, and the foci of the two cavities are substantially coaxial. Energy introduced on coaxial line 116 at the focus of cavity 110 radiates along a radial path from that focus to the periphery where it enters the diode modules, such as 114 of FIG. 12. The diodes within the various modules amplify the signal and return it to focus 118 of cavity 112. To minimize unwanted signals, terminals at focus 120 of cavity 110 and focus 122 of cavity 112 are terminated with their characteristic impedance. Hence the diode modules operate as two-part amplifiers having a relatively weak coupling to input cavity 110 and a relatively strong coupling to output cavity 112. Thus, the largest fraction of the amplified signal is coupled to the output coaxial lead 124. Usually, that fraction of the input signal coupled back to the input would be adjusted to be less than the input signal power. However, this particular adjustment limits the overall gain and hence can be undesirable. The embodiment of FIGS. 11 and 12 allows isolation and stability without this last mentioned adjustment and the accompanying deleterious results.

One of the advantages of the embodiment of FIGS. 11 and 12 is that greater output-to-input isolation is provided. Because of the weak-strong diode module coupling, signals that are traveling in the reverse direction and are incident on output terminal 124 will be amplified but only weakly coupled to input terminal 116. Most of the amplified power will be absorbed in the load at the second focus 122 of output cavity 112. The advantage of this increase isolation is a reduced tendency of the amplifier to oscillate.

A second advantage of this embodiment is better impedance match to both input transmission line 116 and output transmission line 124. This advantage results because all signals reflected by the diode modules on either the input or output side are propagated to the respective foci on which a matched load is attached. The signals are not reflected back towards the input or ouput terminals. With this arrangement, only the mismatch of the transducers at the input and output ports affect the impedance match of the amplifier.

A third advantage is greater latitude in diode module dimensional tolerances. This advantage is a result of the two loaded second foci as discussed above. Because reflected signals are absorbed, greater dimensional tolerances, which would result in greater mismatches, can be permitted.

Also, greater latitude of input and output coupling is provided by the embodiment of FIGS. 11 and 12. This advantage also results from the loaded foci. For a two-port diode module amplifier, this advantage permits stronger input coupling which results in greater gain, but eliminates the stronger return signal. This return signal is composed of a signal reflected from the coupling iris combined with a signal amplified by the diode module and recoupled into input cavity 110. The load on the second focus 120 of input cavity 110 absorbs both parts of this return signal. A further advantage is the elimination of direct coupling between input transducer and output transducer which is possible in structures having input and output terminals in the same cavity. Any signal directly coupled between terminals will beat with that signal propagating to the elliptical perimeter before being collected at the output terminal. This effect will reduce the bandwidth. Absorber can be used in a single cavity configuration of FIG. 1 to reduce the direct coupling, but here, it is completely eliminated.

It is also noted that additional signal gain and input-output impedance isolation for the overall amplifying structure may be readily realized by stacking any number of the structures shown in FIG. 11, one on top of each other. For example, line 116 may be inserted into the output port of a similar elliptical structure (not shown) and the signal to be amplified would be applied to the input line of this additional structure. Although the impedance loading (elements 103 and 107) fo foci 121 and 122 are shown as external to the elliptical cavities for clarity of the illustration, it is understood that these loads may be implemented internal to the structure so as not to interfere with their stacking. Also, either of the foci of a particular cavity may be selected for loading so as to simplify the stacking implementation. For example, referring to the structure of FIG. 11, the focus 101 could be "loaded" in its characteristic impedance and the input signal applied to the line 105, i.e. load 113 would be connected to line 116.

Figure 14:
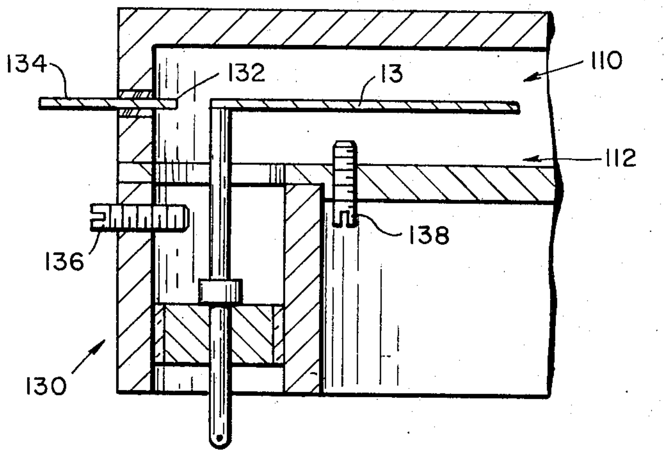
FIG. 14 is a sectional view of the periphery of a pair of stacked elliptical cavities showing another structure for coupling the cavities.

The structure of FIGS. 12 and 13 provides for coupling the amplifier module, such as 114, to the elliptical structure so as to create an overall structure which is flat. FIG. 14 illustrates a method of coupling two elliptical cavities in which the amplifier diodes cavity is arranged similarly to that of FIGS. 3–6. When combined with elliptical cavities such as 110 and 112 of FIG. 11 the coupling of FIG. 14 results in a two-port amplifier module which provides the advantages discussed above relative to FIG. 11. In accordance with the embodiment of FIG. 14, the input signal is fed into the upper elliptical cavity 110 which couples the signal to each of the diode amplifiers, such as 130, arranged around the perimeter, through slot 132 located in septum or wall 13 which separates cavities 110 and 112. The size of slot 132 and hence the amount of coupling can be varied by means of slidably mounted plate 134. Tuning screw 136 is disposed to capacitively load the center of coupling 132. The output coupling is adjustable by means of screw 138 and is normally greater than the input coupling. In this manner the signal reflected back to input cavity 110 is minimized.

Figure 15:
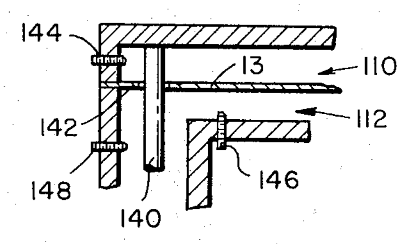
FIG. 15 is a sectional view of the periphery of a pair of stacked elliptical cavities showing yet another structure for coupling the cavities.

FIG. 15 shows another means for coupling the input signal into the diode amplifiers located in elliptical cavity 112. In this embodiment coaxial center conductor 140 is extended through septum 13 which separates the two cavities. The degree of coupling is determined primarily by capacitive by-pass 142 and secondarily by coupling adjustment screws 144 and 146. The larger the by-pass capacity, the smaller the coupling and the by-pass capacitor may be viewed as a leaky end wall of the coaxial cavity in lower elliptical cavity 112. Screw 148 provides tuning adjustment.

Thus there has been described improved devices for coupling microwave diodes and microwave diodes mounted in oscillator or amplifier circuits to power accumulation structures.

What is claimed is:

1. In combination with a substantially right cylindrical elliptical microwave cavity structure having means for introducing microwave energy at a first focus thereof and for removing energy from a second focus thereof, a plurality of amplifier modules formed in a plurality of tunable coaxial cavities disposed around the periphery of said elliptical microwave cavity structure and adapted for producing signals of a greater amplitude than received at the periphery from the first focus, each said amplifier module comprising a microwave diode mounted within said tunable coaxial cavity by means of a microwave choke, a probe electrically coupled to said diode and extending into said elliptical cavity structure, a tuning screw disposed in the wall of said cavity, and at least one coupling screw disposed between said probe and the main body of the elliptical structure so as to allow the adjustment of the electromagnetic coupling of each amplifier module to the elliptical cavity structure.

2. The combination of claim 1 further comprising conductive plates disposed between each of said amplifier modules and extending into said elliptical structure.

3. In combination with a substantially right cylindrical elliptical microwave cavity structure having means for introducing microwave energy at a first focus thereof and for removing energy from a second focus thereof, a plurality of amplifier modules formed in a plurality of tunable coaxial cavities disposed around the periphery of said elliptical microwave cavity structure and adapted for producing signals of a greater amplitude than received at the periphery from the first focus, each said amplifier module comprising a microwave diode mounted within said tunable coaxial cavity by means of a microwave choke, a probe electrically coupled to said diode and extending into said elliptical cavity structure, said amplifier module cavities being arranged outside the perimeter of said elliptical structure and coupled thereto through an iris, and with at least one coupling screw being disposed so as to protrude into said iris and adapted for adjusting the electromagnetic coupling of each amplifier module to the elliptical cavity structure.

4. In a power accumulation device adapted for responding to applied input signals to provide amplified signals at an output terminal thereof: at least two stacked cavity structures with each cavity structure shaped substantially in the form of a right elliptical cylinder and having a common septum therebetween with slots therethrough, a plurality of amplifier modules disposed on the periphery of said stacked cavity structure with said amplifier modules including means for coupling signals between said stacked cavity structures, whereby signals applied at one focus of one of said stacked cavity structures are amplified by said amplifier modules and applied with power gain to one focus of the other said stacked cavity structure; and signal coupling means for applying the input signal at one focus of one of said stacked cavity structures and for removing the resultant amplified signals from one focus of the other stacked cavity structure; and wherein said amplifier modules are formed in a plurality of tunable coaxial cavities disposed around the periphery of said elliptical microwave cavity structure and adapted for producing signals of a greater amplitude than received at the periphery from the first focus, each said amplifier module comprising a microwave diode mounted within said tunable coaxial cavity by means of a microwave choke, a probe electrically coupled to said diode and extending into one of said elliptical cavity structures, a moveable member disposed relative to one of said slots through said common septum so as to form a portion of the wall defining said slot, whereby the amount of coupling between the cavity structures is variable by means of said moveable member.

5. In combination with a substantially right cylindrical elliptical microwave cavity structure having means for introducing microwave energy at a first focus thereof and for removing energy from a second focus thereof, a plurality of amplifier modules formed in a plurality of tunable coaxial cavities disposed around the periphery of said elliptical microwave cavity structure and adapted for producing signals of a greater amplitude than received at the periphery from the first focus, each said amplifier module comprising a microwave diode mounted within said tunable coaxial cavity by means of a microwave choke, a probe electrically coupled to said diode and having a coupling loop portion which extends into said elliptical cavity structure, and wherein said amplifier module is rotatable mounted normal to the side wall which defines said microwave cavity structure and whereby rotation of said module operates to position said coupling loop.

6. In the combination of claim 5 wherein said amplifier module further comprises a dielectric cylindrical slug which encompasses a portion of said probe within the high electrical field region of said tunable coaxial cavity of said slug being positionable along the center axis of said probe.

* * * * *